May 10, 1966

K. CLARKE ET AL 3,250,573

CONVEYORS

Filed May 14, 1964

INVENTORS
KENNETH CLARKE
JASON ARGENT WARE
RAYMOND GEORGE HUTCHINGS

By
Cushman, Darby & Cushman
ATTORNEYS

May 10, 1966  K. CLARKE ET AL  3,250,573
CONVEYORS

Filed May 14, 1964  3 Sheets-Sheet 3

INVENTORS
KENNETH CLARKE
JASON ARGENT WARE
RAYMOND GEORGE HUTCHINGS
BY Cushman, Darby & Cushman
ATTORNEYS

United States Patent Office 3,250,573
Patented May 10, 1966

3,250,573
CONVEYORS
Kenneth Clarke, Knebworth, Jason Argent Ware, near Braughing, and Raymond George Hutchings, Darwen, England, assignors to Imperial Chemical Industries Limited, London, England, a corporation of Great Britain
Filed May 14, 1964, Ser. No. 367,408
Claims priority, application Great Britain, May 14, 1963, 19,082/63
1 Claim. (Cl. 302—29)

This invention relates to improvements in or relating to conveyors and in particular to a conveyor for conveying sheet materials.

With conveyors for sheet materials normally in use, it is often difficult to avoid damaging the surface of the sheet. For example if a simple roller conveyor is used, the sheet contacts the rollers and if a light sheet is being conveyed, the sheet may, on occasions, slide over the rollers without rotating them, thereby increasing the possibility of scratching the surface of the sheet. Also if the sheet does not move in a direction exactly perpendicular to the axis of any roller then it will have a sliding motion over that roller which also increases the possibility of scratching.

Similarly, if a simple continuous belt conveyor is used to transport sheets, scratching is likely to happen when the sheets enter and leave the conveyor.

It has been proposed in order to overcome this disadvantage to support sheet materials on air jets emerging from perforations in a flat plate. However, it has been found that when using this system the sheet is only lifted a few thousandths of an inch from the flat plate. Thus as the sheet is moved over the flat plate, it will contact the latter at any point where there are any irregularities in the surface of the plate. This contact is again liable to damage the sheet by scratching. Thus to avoid this it is necessary to utilise a flat plate constructed to very close tolerances.

Furthermore, this method suffers from the disadvantage that because of the use of air jets relatively high air pressures are necessary and so the apparatus may be uneconomical to operate.

It is an object of the present invention to provide apparatus for conveying or supporting sheet materials so that the sheets are free to move in one or more directions and which does not necessitate construction of the apparatus to very close tolerances.

According to the present invention we provide apparatus for conveying or supporting sheet material comprising a surface over which sheet material can be freely moved along a substantially flat path at least in the longitudinal direction of the surface and means whereby a plurality of cushions of gas can be provided between said surface and a sheet passing thereover, the periphery of each cushion enclosing an area defined by a substantially continuous thin line from which compressed gas can be caused to rise from said surface. The thin line is conveniently a substantially continuous slot formed in said surface.

More particularly in accordance with the present invention we provide apparatus for use in conveying or supporting sheet material comprising a conveying or supporting means having a surface providing a flat path in at least one direction and having a plurality of narrow elongated slots providing communicating passages from the conveying or supporting surface to the underside of said means and defining a plurality of areas on said surface at least the greater part of the periphery of each area being formed by said slots, and means to force gas through said slots from said underside, whereby sheet material may be supported by one or more cushions of gas formed between the underside of said sheet and said surface.

Generally our apparatus is intended for use in conveying sheets along a particular path, and in such a case the path length of the conveyor, i.e. its longitudinal direction will be greater than the lateral width of the conveyor. For the most efficient use of the apparatus it is preferred that a sheet passing along the conveyor should always cover at least one cushion of gas extending the whole lateral width of the surface or two or more cushions which together extend across the whole lateral width of the surface. We also prefer that the gas cushions extending in the longitudinal direction, i.e. the direction of travel along the surface of the conveyor, should form an uninterrupted series, i.e. the boundary between adjacent cushions should be the line of compressed gas rising from the surface.

We prefer for ease of construction that the gas cushion should be a rectangle and that it should be as large as possible in relation to the sheet being supported. In general, if a sheet is to move any considerable distance along the conveying apparatus it will be found that with a rectangular arrangement of slots, each rectangle should cover not more than half the area of the sheet so that the sheet always completely covers at least one cushion of gas formed between its lower surface and the surface of the conveyor. Clearly, this requirement relates to the smallest sheet being handled, and in designing our conveyor it is necessary to take into consideration the sizes of the sheets to be carried by it. The area of the rectangle should be as large as possible since this means that the length of the slots required is a minimum and so, in operation, a minimum amount of gas is required to support the sheets. The slots need not bound the cushion completely but any discontinuity in the boundary should be kept as small as possible; that is to say, the slots should extend sufficiently so that a cushion of gas is maintained between the underside of a sheet and the area bounded by the slots as the sheet passes over that area. It will be appreciated that other geometrical shapes for the gas cushions, e.g. triangles, may be used.

We further provide in accordance with our invention a method of conveying a sheet comprising passing a gas through or from a surface in an apparatus as hereinbefore described and supporting said sheet upon the cushions of gas formed between the underside of the sheet and said surface while it is constrained to move along the said surface, the peripheries of the cushion being such that during its passage along the conveyor the sheet completely covers at least one of said cushions.

The embodiments of the invention will now be described by way of example only together with further inventive features, with reference to the accompanying drawings wherein.

Figure 1:
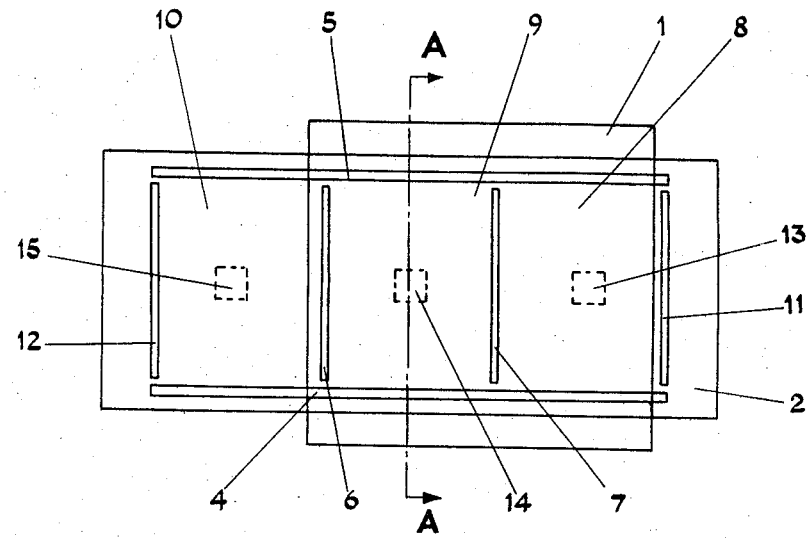
FIGURE 1 is a plan view of a sheet supported over a plate
Figure 2:
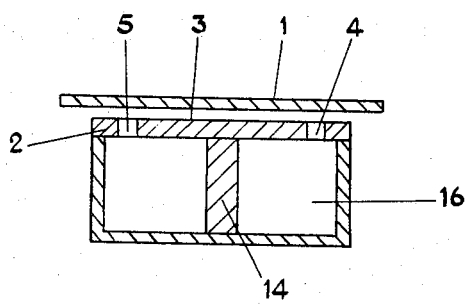
FIGURE 2 is a cross-section along the dotted line A—A shown in FIGURE 1

In FIGURES 1 and 2 the apparatus is in the form of a long but shallow closed rectangular box, the upper part of the box being provided with the surface 2. A sheet of glass 1 is shown supported above the surface 2 by means of an air cushion. The box has means (not shown) to keep it filled with air at a pressure of 4 inches of water above atmospheric.

The surface 2 is divided up into three areas 8, 9 and 10 by means of the slots 4, 5, 6, 7, 11 and 12, and the air cushion that supports the sheet of glass 1 is provided by the air issuing from these slots. The slots are each $\frac{1}{32}''$ wide. In FIGURE 2 the section of the space occupied by the air cushion is shown at 3, the periphery of the air cushion being formed by the slots 4, 5, 6 and 7 as shown in FIGURE 1. To ensure that the sheet of glass is always supported by at least one air cushion, the distance between slots 4 and 5 is less than the width of the sheet of glass, while the distance between slots 12 and 6, 6 and 7, and 7 and 11 is each less than half the length of the sheet of glass 1. In FIGURE 1 the sheet of glass is shown supported by the air cushion in area 9, and partially by air issuing from the slots bounding the three sides of area 8.

For ease of construction the slots 6, 7, 11 and 12 do not join up with slots 4, 5 but small gaps are left to provide support for the rectangles 8, 9, 10 of plate 2. These are further supported by pillars 13, 14 and 15. The air is supplied to the slots via a duct 16 under the surface 2.

In order to cause sheets to move along the length of the conveyor, the latter is longitudinally inclined at a small angle to the horizontal. This allows sheets to move quite freely and without further assistance along the conveyor. To prevent any tendency for the sheets to move sideways the surface 2 is inclined at a small angle so that one side is slightly higher than the other, and a guide rail is provided along the lower side so that sheets initially placed on the conveyor will move in the direction of the lower and will move properly aligned by the guide rail along the conveyor.

The conveyor shown in FIGURE 1 is of relatively short length, but it will be appreciated that the length of the conveyor can be extended to any desired amount following the construction. In a longer conveyor it may be desirable to avoid loss of pressure along the length by having a plurality of compartments under the surface 2 for containing gas under pressure.

Figure 3:
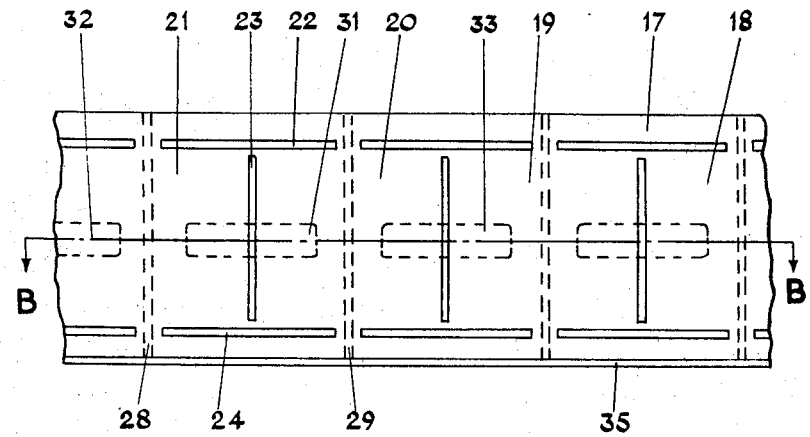
FIGURE 3 is a plan view of part of a conveyor
Figure 4:
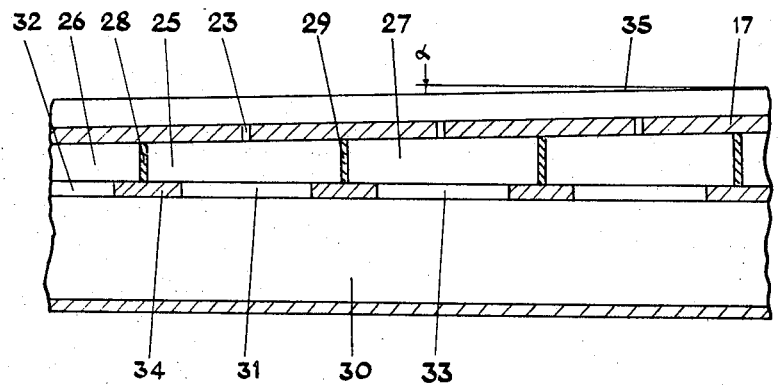
FIGURE 4 is a longitudinal section along the chain dotted line B—B shown in FIGURE 3
Figure 5:
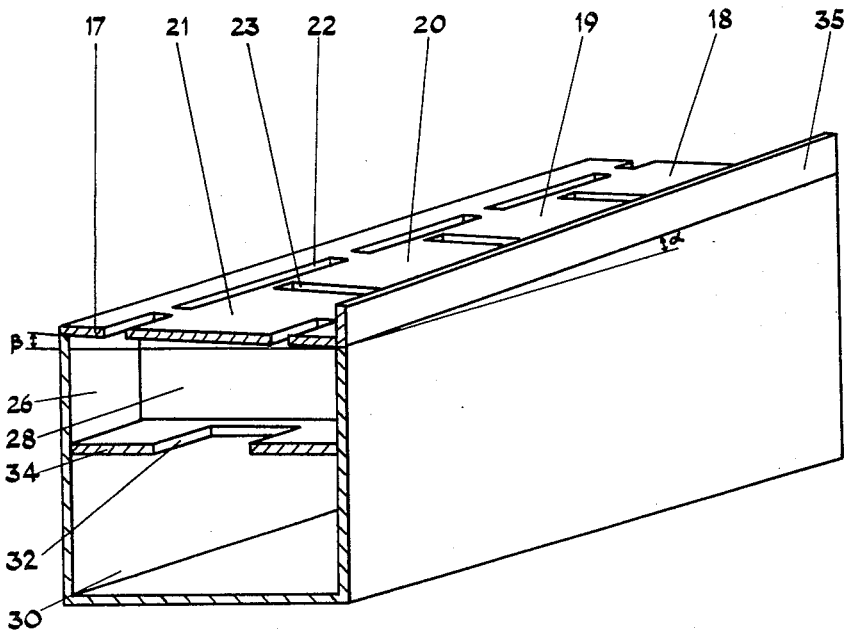
FIGURE 5 is a perspective view of the conveyor shown in FIGURES 3 and 4.

In FIGURES 3, 4 and 5 part of a conveyor is shown constructed from several sections. The conveyor comprises a plate 17 which has slots cut into it. The slots define rectangles 18, 19, 20, 21. Each section of the conveyor has three slots cut in the plate, for example, slots 22, 23, 24. These slots are fed with air from a chamber 25 which is separated from adjacent chambers 26, 27 by partitions 28, 29. Each of these chambers is fed with air from a large duct 30 via apertures 31, 32, 33 in the plate 34 forming the bottom of the chambers. By this method an even distribution of air emerging from the slots may be obtained.

A rail 35 is fitted to plate 17 to act as a guide for the edges of sheets passing along the conveyor. In order that the sheets can move along the conveyor, plate 17 is tilted longitudinally by a small angle, so that the edges of the sheets may tend to bear against the rail 35; the plate 17 is also tilted by a small angle in the plane perpendicular to length of the conveyor. Directional movement may be imparted to a sheet by causing the compressed gas issuing from the slots to possess a component of movement along the plane of the surface of the apparatus in the required direction of travel of a sheet along the surface. This may be effected by inclining the direction of the transverse slots away from the vertical in the direction in which movement is desired.

In a further method the surface of the conveyor can be kept horizontal in the longitudinal direction and be given a slight lateral tilt; a guard rail is provided having a continuous moving band. Sheets placed on this conveyor will tend to move laterally until one edge bears against the moving band which will then cause the sheet to be carried forward. This method has the advantage that movement of the sheets in the longitudinal direction can be carefully controlled.

In a specific embodiment the slots had a width of 1/32" and using an air pressure corresponding to a 4 inch head of water above atmospheric pressure a 3/8" thick glass sheet of dimensions 18 inches by 12 inches was supported 0.05 inch above the plate, while a plastic sheet of similar dimensions but 1/4" thick was supported 0.10 inch above the plate. In this embodiment the slots defining the air cushions formed rectangles 10 x 5 inches. In a further embodiment designed to convey rigid sheets of plastic material 9 x 6 feet, the conveyor was 6 feet wide and had a longitudinal slot running along each edge, the two slots being 5'6" apart, and had transverse slots joining the longitudinal slots, the transverse slots being at 6" intervals. In this embodiment a 1 horsepower motor was sufficient for each 6 foot run to conveyor to lift the plastic sheet (1/4" thick) by 0.10 inch.

It will be appreciated that many modifications of the apparatus are possible. For example for transporting corrugated sheets where the corrugations lie parallel to the length of the sheet, the slotted plate may be correspondingly corrugated along its length.

Our apparatus is particularly suitable for conveying sheets of any material that is liable to be scratched by contact with any hard surface. It is thus of value for conveying during the course of manufacture, sheets of glass or plastic particularly sheets of acrylic resins, polyvinyl chloride, polystyrene and cellulose acetate. By virtue of the fairly wide clearances that can be obtained, e.g. up to 0.2", with relatively low air pressurres, e.g. 2.5 to 5" of water, it is possible to convey sheets without having to construct the surface of the conveyor so that its flatness lies within certain very closely defined limits. This means that the cost of constructing our apparatus is considerably reduced, and since the air usage is low, the running costs are low.

We claim:

Apparatus for conveying or supporting sheet material comprising a surface over which sheet material can be freely moved along a substantially flat path, means for providing a cushion of gas between said surface and a sheet passing thereover, said surface having a first inclination in the longitudinal direction in which a sheet is intended to move over the surface and a second inclination in a direction lateral to said first inclination, and including retaining means along a lower longitudinal edge of said surface for retaining on the surface a sheet carried thereon, wherein said retaining surface is a movable surface that can be caused to move in the longitudinal direction of the apparatus.

References Cited by the Examiner
UNITED STATES PATENTS

| | | | |
|---|---|---|---|
| 2,538,972 | 1/1951 | Magnani. | |
| 2,778,691 | 1/1957 | Hazel. | |
| 2,805,898 | 9/1957 | Willis | 302—29 |
| 3,040,688 | 6/1962 | Gram. | |
| 3,180,688 | 4/1965 | Futer | 302—29 |

MARVIN A. CHAMPION, *Primary Examiner.*